(12) United States Patent
Gill

(10) Patent No.: US 7,237,322 B2
(45) Date of Patent: Jul. 3, 2007

(54) METHOD FOR MAKING A TUNNEL VALVE HEAD WITH A FLUX GUIDE

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 193 days.

(21) Appl. No.: 10/976,661

(22) Filed: Oct. 29, 2004

(65) Prior Publication Data

US 2005/0064092 A1    Mar. 24, 2005

Related U.S. Application Data

(62) Division of application No. 09/902,122, filed on Jul. 10, 2001, now Pat. No. 7,057,864.

(51) Int. Cl.
    *H04R 31/00*    (2006.01)
(52) U.S. Cl. .................. 29/603.13; 29/603.14; 29/603.15; 29/603.16; 29/603.18; 29/603.2; 216/22; 216/39; 216/41; 216/48; 360/324.11; 360/324.12; 360/320; 360/321; 360/324.2; 427/127; 427/128
(58) Field of Classification Search .............. 29/603.1, 29/603.13–603.16, 603.18, 603.2; 360/324.1, 360/324.11, 324.12, 320, 321, 324.2; 216/22, 216/39, 41, 48, 62, 66; 427/127, 128
    See application file for complete search history.

(56) References Cited

U.S. PATENT DOCUMENTS 4,996,621 A    2/1991  Ruigrok et al.

5,764,453 A    6/1998  Postma et al.

(Continued)

FOREIGN PATENT DOCUMENTS

JP    8-017020    1/1996

(Continued)

OTHER PUBLICATIONS

"Evaluation of front flux guide-type magnetic tunnel junction heads"; Shimazawa, K.; Redon, O.; Kasahara, N.; Sun, J.J.; Sato, K.; Kagami, T.; Saruki, S.; Umehara, T.; Fujita, Y.; Yarimizu, S.; Araki, S.; Morita, H.; Matsuzaki, M.; Magnetics, IEEE Transactions on vol. 36, Issue 5, Part 1; Sep. 2000; pp. 2542-2544.*

(Continued)

*Primary Examiner*—Paul D. Kim
(74) *Attorney, Agent, or Firm*—David W. Lynch; Chambliss, Bahner & Stophel PC

(57) ABSTRACT

A method for making a tunnel valve head with a flux guide. The tunnel valve sensor is created by forming a tunnel valve at a first shield layer. The tunnel valve includes a free layer distal to the first shield layer, a first insulation layer deposited over the first shield layer and around the tunnel valve, a flux guide formed over the first insulation layer and coupling to the tunnel valve at the free layer, a second insulation layer formed over the flux guide and a second shield layer formed over the second insulation layer. The flux guide and the free layer are physically isolated by the first and second insulation layers to prevent current shunts therefrom. The structure achieves physical connection between the flux guide and the free layer and insulates the flux guide from the shields.

7 Claims, 7 Drawing Sheets

U.S. PATENT DOCUMENTS

| | | | |
|---|---|---|---|
| 5,898,547 A | 4/1999 | Fontana, Jr. et al. | |
| 5,901,018 A | 5/1999 | Fontana, Jr. et al. | |
| 5,930,087 A | 7/1999 | Brug et al. | |
| 6,005,753 A | 12/1999 | Fontana, Jr. et al. | |
| 6,542,343 B1 * | 4/2003 | Gill | 360/324.2 |
| 6,671,136 B2 * | 12/2003 | Arai et al. | 360/321 |

FOREIGN PATENT DOCUMENTS

| | | |
|---|---|---|
| JP | 8-115511 | 5/1996 |
| JP | 8-255312 | 10/1996 |
| JP | 11213349 A * | 8/1999 |
| JP | 2000123326 A * | 4/2000 |
| WO | WO 97/28528 | 8/1997 |

OTHER PUBLICATIONS

"Construction of Tunnel Junction Head With Flux Guides," RD n429, Jan. 2000, Article 167, p. 198.

"Insulating Flux Guide for a Tunnel Junction Sensor," RD n428, Dec. 1999, Aricle 154, p. 1712.

* cited by examiner

METHOD FOR MAKING A TUNNEL VALVE HEAD WITH A FLUX GUIDE

RELATED PATENT DOCUMENTS

This application is a divisional of U.S. patent application Ser. No. 09/902,122, filed on Jul. 10, 2001 (SJO920010042US1), now U.S. Pat. No. 7,057,864, to which priority is claimed under 35 U.S.C. § 120, and which is incorporated herein by reference.

BACKGROUND OF THE INVENTION

1. Field of the Invention

This invention relates in general to magnetoresistive (MR) heads for reading magnetically recorded data, and more particularly to a method and apparatus for providing a structure that achieves physical connection between the flux guide and the free layer and that insulates the flux guide from the shields.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the a real density or density of written data bits on the magnetic medium has increased by a factor of more than two million since the first disk drive was applied to data storage. Since 1991, areal density has grown by the well-known 60% compound growth rate, and this is based on corresponding improvements in heads, media, drive electronics, and mechanics.

Magnetic recording heads have been considered the most significant factor in areal-density growth. The ability of these components to both write and subsequently read magnetically recorded data from the medium at data densities well into the Gbits/in$^2$ range gives hard disk drives the power to remain the dominant storage device for many years to come.

The heart of a computer is an assembly that is referred to as a magnetic disk drive. The disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air-bearing surface (ABS). The suspension arm biases the slider into contact with the surface of the disk when the disk is not rotating. However, when the disk rotates, air is swirled by the rotating disk adjacent the ABS causing the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

A magnetoresistive (MR) sensor detects magnetic field signals through the resistance changes of a sensing element, fabricated of a magnetic material, as a function of the strength and direction of magnetic flux being sensed by the sensing element. Conventional MR sensors, such as those used as a MR read heads for reading data in magnetic recording disk drives, operate on the basis of the anisotropic magnetoresistive (AMR) effect of the bulk magnetic material, which is typically permalloy ($Ni_{81}Fe_{19}$). A component of the read element resistance varies as the square of the cosine of the angle between the magnetization direction in the read element and the direction of sense current through the read element. Recorded data can be read from a magnetic medium, such as the disk in a disk drive, because the external magnetic field from the recorded magnetic medium (the signal field) causes a change in the direction of magnetization in the read element, which in turn causes a change in resistance of the read element and a corresponding change in the sensed current or voltage.

An MTJ device has been proposed as a magnetoresistive read head for magnetic recording in U.S. Pat. No. 5,390,061. A magnetic tunnel junction (MTJ) device is comprised of two ferromagnetic layers separated by a thin insulating tunnel barrier layer and is based on the phenomenon of spin-polarized electron tunneling. Such sensors are also referred to tunnel valve sensors. In such sensors, one of the ferromagnetic layers has a higher saturation field in one direction of an applied magnetic field, typically due to its higher coercivity than the other ferromagnetic layer. The insulating tunnel barrier layer is thin enough that quantum mechanical tunneling occurs between the ferromagnetic layers. The tunneling phenomenon is electron-spin dependent, making the magnetic response of the MTJ a function of the relative orientations and spin polarizations of the two ferromagnetic layers.

In an MTJ read head, the free ferromagnetic layer, the tunnel barrier layer and the fixed ferromagnetic layer all have their edges exposed at the sensing surface of the head, i.e., the air-bearing surface (ABS) of the air-bearing slider if the MTJ head is used in a magnetic recording disk drive. It has been discovered that when the MTJ head is lapped to form the ABS, it is possible that material from the free and fixed ferromagnetic layers will smear at the ABS and short out across the tunnel barrier layer. In addition, many antiferromagnets used to fix the magnetic moment of the fixed ferromagnetic layer contain manganese (Mn) which can corrode during the ABS lapping process. The tunnel barrier layer is typically formed of aluminum oxide, which can also corrode during the ABS lapping process. Accordingly, an tunnel valve read head for a magnetic recording system wherein the free ferromagnetic layer also acts as a flux guide to direct magnetic flux from the magnetic recording medium to the tunnel junction has been proposed to solve these problems. In a magnetic recording disk drive embodiment, the fixed ferromagnetic layer has its front edge recessed from the ABS while the sensing end of the free ferromagnetic layer is exposed at the ABS. The front edge of the tunnel barrier layer may also be recessed from the ABS. Both the fixed and free ferromagnetic layers are in contact with opposite surfaces of the tunnel barrier layer but the free ferromagnetic layer extends beyond the back edge of either the tunnel barrier layer or the fixed ferromagnetic layer, whichever back edge is closer to the sensing surface. This assures that the magnetic flux is non-zero in the tunnel junction region. The magnetization direction of the fixed ferromagnetic layer is fixed in a direction generally perpendicular to the ABS and thus to the disk surface, preferably by interfacial exchange coupling with an antiferromagnetic layer. The magnetization direction of the free ferromagnetic layer is aligned in a direction generally parallel to the surface of the ABS in the absence of an applied magnetic field and is free to rotate in the presence of applied magnetic fields from the magnetic recording disk. A layer of high coercivity hard magnetic material adjacent the sides of the free ferromagnetic layer longitudinally biases the magnetization of the free ferromagnetic layer in the preferred direction.

However, to prevent shunting of current, the flux guide needs to be insulated. To achieve high efficiency, it is necessary that there be no separation between the flux guide and the free layer.

It can be seen that there is a need for a method and apparatus for providing a structure that achieves physical connection between the flux guide and the free layer and that insulates the flux guide from the shields.

SUMMARY OF THE INVENTION

To overcome the limitations in the prior art described above, and to overcome other limitations that will become apparent upon reading and understanding the present specification, the present invention discloses a method and apparatus for providing a structure that achieves physical connection between the flux guide and the free layer and that insulates the flux guide from the shields.

The present invention solves the above-described problems by separating the flux guide and the free layer to prevent the shunting of current.

A method in accordance with the principles of the present invention includes forming a tunnel valve at a first shield layer, the tunnel valve comprising a free layer distal to the first shield layer, depositing a first insulation layer over the first shield layer and around the tunnel valve, depositing a flux guide over the first insulation layer and coupling to the tunnel valve at the free layer, covering the flux guide with a second insulation layer and forming a second shield layer over the second insulation, wherein the flux guide and the free layer are physically isolated by the first and second insulation layers to prevent current shunts therefrom.

Other embodiments of a method in accordance with the principles of the invention may include alternative or optional additional aspects. One such aspect of the present invention is that the depositing the first insulation layer over the first shield layer and around the tunnel valve is performed using a self-aligning process wherein regions of different thicknesses are formed with a single masking step.

Another aspect of the present invention is that the flux guide is physically connected to the free layer of the tunnel valve.

Another aspect of the present invention is that the covering the flux guide with a second insulation layer is performed using a self-aligning process wherein regions of different thicknesses are formed with a single masking step.

Another aspect of the present invention is that the flux guide increases the amount of magnetic flux in the tunnel valve.

Another aspect of the present invention is that the increase in the amount of magnetic flux in the tunnel valve enhances the output signal fo the tunnel valve.

Another aspect of the present invention is that the forming a tunnel valve at a first shield layer further includes forming an antiferromagnetic (AFM) layer of electrically insulating antiferromagnetic material, depositing a pinned layer of ferromagnetic material in contact with said AFM layer, said pinned layer making electrical contact with said first shield, forming a free layer of ferromagnetic material and forming a tunnel junction layer of electrically insulating material between said pinned and free layers.

In another embodiment of the present invention, a tunnel valve sensor is disclosed. The tunnel valve sensor includes a tunnel valve disposed at a first shield layer, the tunnel valve comprising a free layer distal to the first shield layer, a first insulation layer formed over the first shield layer and around the tunnel valve, a flux guide deposited over the first insulation layer, the flux guide being coupled to the tunnel valve at the free layer, a second insulation layer covering the flux guide; and a second shield layer deposited over the second insulation, wherein the flux guide and the free layer are physically isolated by the first and second insulation layers to prevent current shunts therefrom.

Another aspect of the present invention is that the flux guide is physically connected to the free layer of the tunnel valve.

Another aspect of the present invention is that the flux guide increases the amount of magnetic flux in the tunnel valve.

Another aspect of the present invention is that the increase in the amount of magnetic flux in the tunnel valve enhances the output signal fo the tunnel valve.

Another aspect of the present invention is that the tunnel valve further includes an antiferromagnetic (AFM) layer of electrically insulating antiferromagnetic material, a pinned layer of ferromagnetic material in contact with said AFM layer, said pinned layer making electrical contact with said first shield, a free layer of ferromagnetic material and a tunnel junction layer of electrically insulating material disposed between said pinned and free layers.

In another embodiment of the present invention, a magnetic storage device is disclosed. The magnetic storage system includes a magnetic recording medium, an actuator for moving the tunnel valve sensor across the magnetic recording disk so the tunnel valve sensor may access different regions of magnetically recorded data on the magnetic recording medium, a data channel coupled electrically to the tunnel valve sensor for detecting changes in resistance of the tunnel valve sensor caused by rotation of the magnetization axis of the free ferromagnetic layer relative to the fixed magnetization of the pinned layer in response to magnetic fields from the magnetically recorded data and a tunnel valve sensor disposed proximate the recording medium, the tunnel vavle sensor, includes a tunnel valve disposed at a first shield layer, the tunnel valve comprising a free layer distal to the first shield layer, a first insulation layer formed over the first shield layer and around the tunnel valve, a flux guide deposited over the first insulation layer, the flux guide being coupled to the tunnel valve at the free layer, a second insulation layer covering the flux guide and a second shield layer deposited over the second insulation, wherein the flux guide and the free layer are physically isolated by the first and second insulation layers to prevent current shunts therefrom.

Another aspect of the present invention is that the flux guide is physically connected to the free layer of the tunnel valve.

Another aspect of the present invention is that the flux guide increases the amount of magnetic flux in the tunnel valve.

Another aspect of the present invention is that the increase in the amount of magnetic flux in the tunnel valve enhances the output signal fo the tunnel valve.

Another aspect of the present invention is that wherein the tunnel valve further includes an antiferromagnetic (AFM) layer of electrically insulating antiferromagnetic material, a pinned layer of ferromagnetic material in contact with said AFM layer, said pinned layer making electrical contact with said first shield, a free layer of ferromagnetic material and a tunnel junction layer of electrically insulating material disposed between said pinned and free layers.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing a structure that achieves physical connection between the flux guide and the free layer and that insulates the flux guide from the shields. By separating the flux guide and the free layer from the shields, the shunting of current is prevented.

Figure 1:
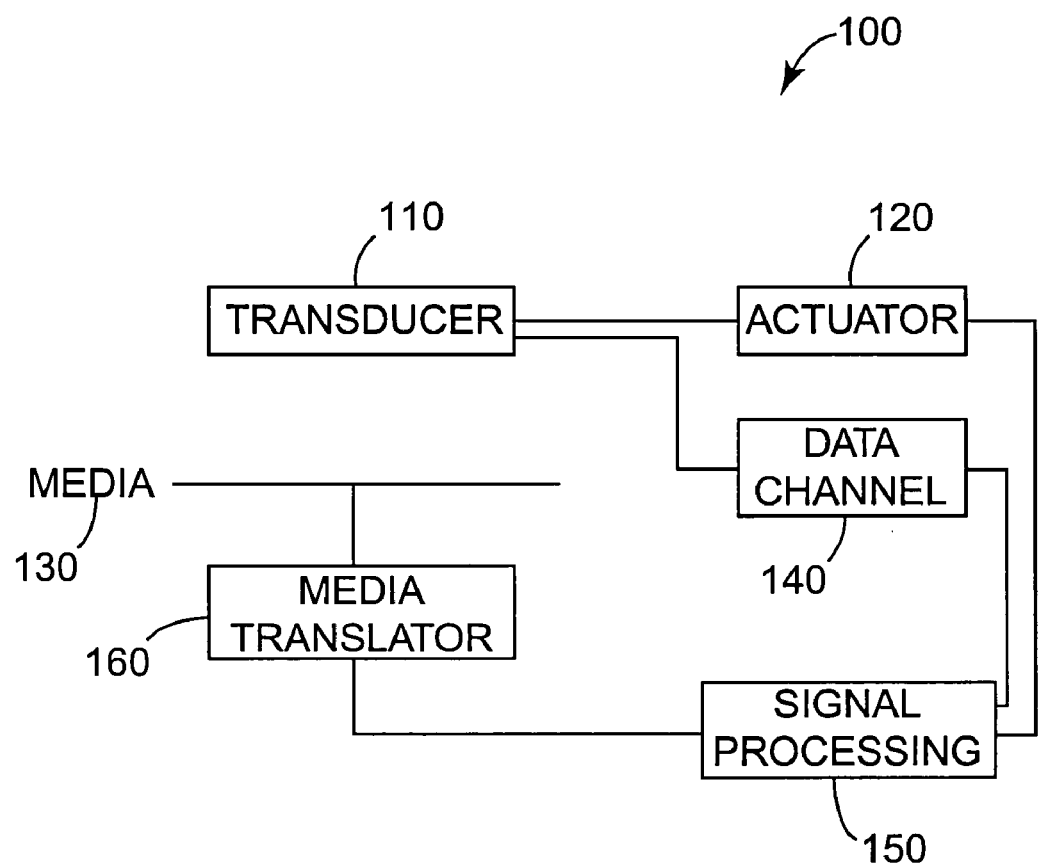
FIG. 1 illustrates a storage system according to the present invention.

FIG. 1 illustrates a storage system 100 according to the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A system processor 150 controls the actuator 120 and processes the signals of the data channel 140. In addition, a media translator 160 is controlled by a system processor 150 to cause the magnetic media 130 to move relative to the transducer 110. The present invention is not meant to be limited to a particular type of storage system 100 or to the type of media 130 used in the storage system 100.

Figure 2:
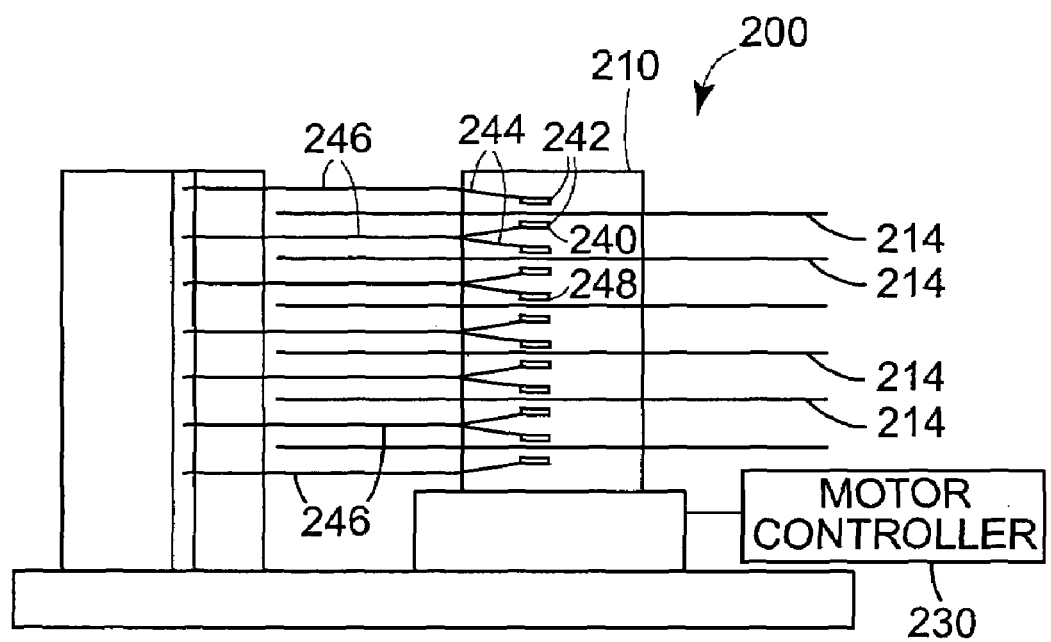
FIG. 2 illustrates one particular embodiment of a storage system according to the present invention.

FIG. 2 illustrates one particular embodiment of a storage system 200 according to the present invention. In FIG. 2, a hard disk drive 200 is shown. The drive 200 includes a spindle 210 that supports and rotates a magnetic disk 214. The spindle 210 is rotated by a motor 220 that is controlled by a motor controller 230. A combined read and write magnetic head 240 is mounted on a slider 242 that is supported by a suspension 244 and actuator arm 246. Processing circuitry 250 exchanges signals, representing such information, with the head 240, provides motor drive signals for rotating the magnetic disk 214, and provides control signals for moving the slider to various tracks. A plurality of disks 214, sliders 242 and suspensions 244 may be employed in a large capacity direct access storage device (DASD).

The suspension 244 and actuator arm 246 position the slider 242 so that the magnetic head 240 is in a transducing relationship with a surface of the magnetic disk 214. When the disk 214 is rotated by the motor 220 the slider 240 is supported on a thin cushion of air (air bearing) between the surface of the disk 214 and the air-bearing surface (ABS) 248. The magnetic head 240 may then be employed for writing information to multiple circular tracks on the surface of the disk 214, as well as for reading information therefrom.

Figure 3:
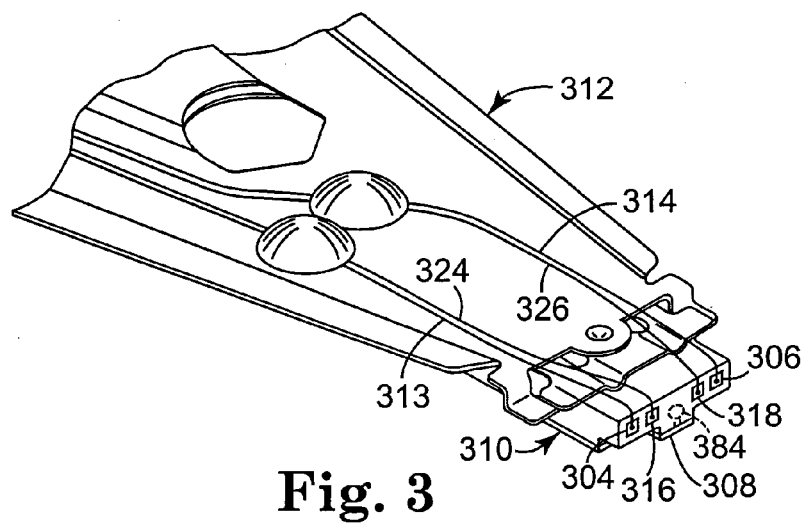
FIG. 3 illustrates a slider mounted on a suspension.

FIG. 3 illustrates a slider 310 mounted on a suspension 312. In FIG. 3 first and second solder connections 304 and 306 connect leads from the sensor 308 to leads 313 and 314 on the suspension 312 and third and fourth solder connections 316 and 318 connect the coil 384 to leads 324 and 326 on the suspension.

Figure 4:
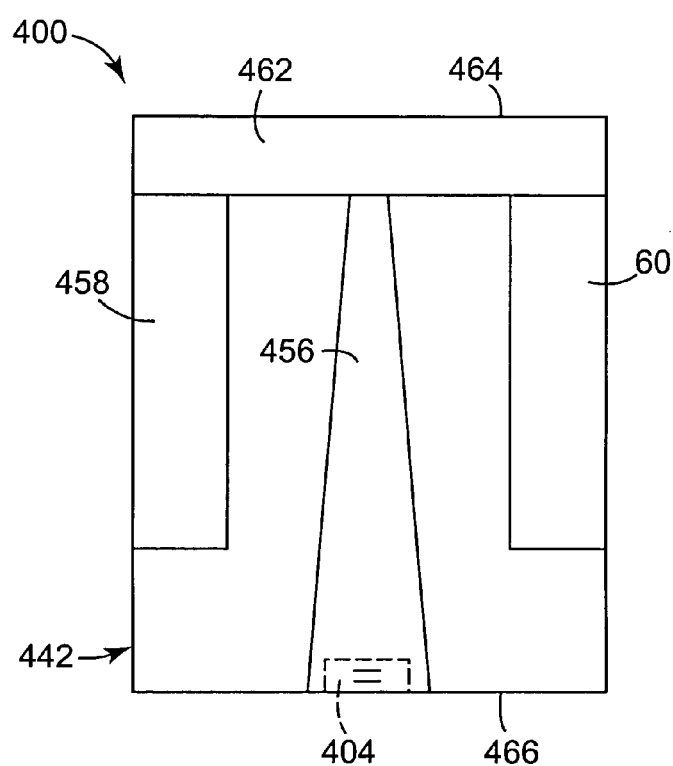
FIG. 4 is an ABS view of the slider and the magnetic head.

FIG. 4 is an ABS view of the slider 400 and the magnetic head 404. The slider has a center rail 456 that supports the magnetic head 404, and side rails 458 and 460. The rails 456, 458 and 460 extend from a cross rail 462. With respect to rotation of a magnetic disk, the cross rail 462 is at a leading edge 464 of the slider and the magnetic head 404 is at a trailing edge 466 of the slider.

Figure 5:
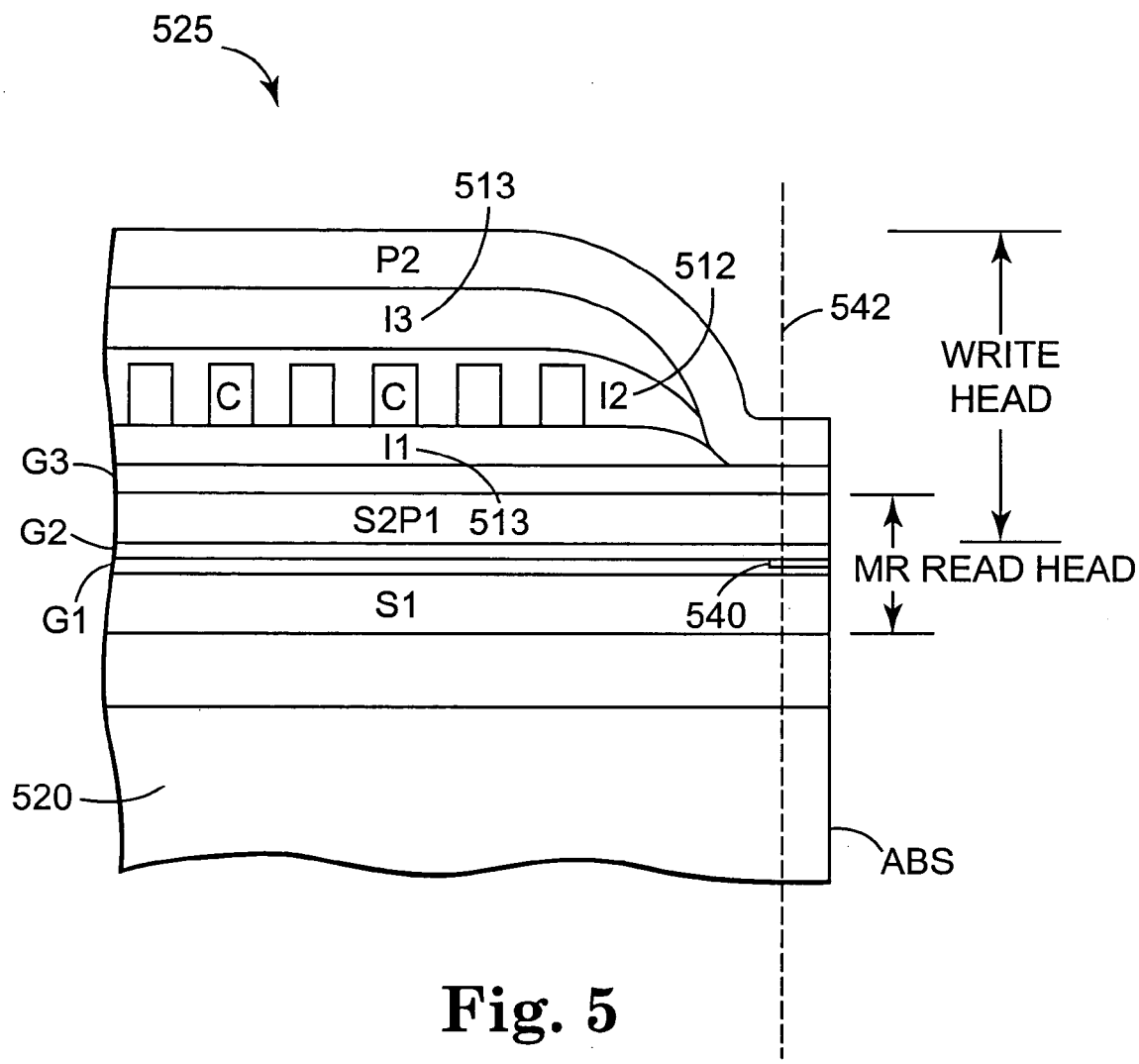
FIG. 5 is a cross-sectional schematic view of the integrated read/write head which includes a MR read head portion and an inductive write head portion.

FIG. 5 is a cross-sectional schematic view of the integrated read/write head 525 which includes a MR read head portion and an inductive write head portion. The head 525 is lapped to form an air-bearing surface (ABS), the ABS being spaced from the surface of the rotating disk 516 by the air bearing as discussed above. The read head includes a MR sensor 540 sandwiched between first and second gap layers G1 and G2 which are, in turn, sandwiched between first and second magnetic shield layers S1 and S2. In a conventional disk drive, the MR sensor 540 is an AMR sensor. The write head includes a coil layer C and insulation layer 512 which are sandwiched between insulation layers 511 and 513 which are, in turn, sandwiched between first and second pole pieces P1 and P2. A gap layer G3 is sandwiched between the first and second pole pieces P1, P2 at their pole tips adjacent to the ABS for providing a magnetic gap. During writing, signal current is conducted through the coil layer C and flux is induced into the first and second pole layers P1, P2 causing flux to fringe across the pole tips at the ABS. This flux magnetizes circular tracks on the rotating disk during a write operation. During a read operation, magnetized regions on the rotating disk inject flux into the MR sensor 540 of the read head, causing resistance changes in the MR sensor 540. These resistance changes are detected by detecting voltage changes across the MR sensor 540. The combined head 525 shown in FIG. 5 is a "merged" head in which the second shield layer S2 of the read head is employed as a first pole piece P1 for the write head. In a piggyback head (not shown), the second shield layer S2 and the first pole piece P1 are separate layers.

The above description of a typical magnetic recording disk drive with an AMR read head, and the accompanying FIGS. 1–5, are for representation purposes only. Disk drives may contain a large number of disks and actuators, and each actuator may support a number of sliders. In addition, instead of an air-bearing slider, the head carrier may be one which maintains the head in contact or near contact with the disk, such as in liquid bearing and other contact and near-contact recording disk drives.

Figure 6:
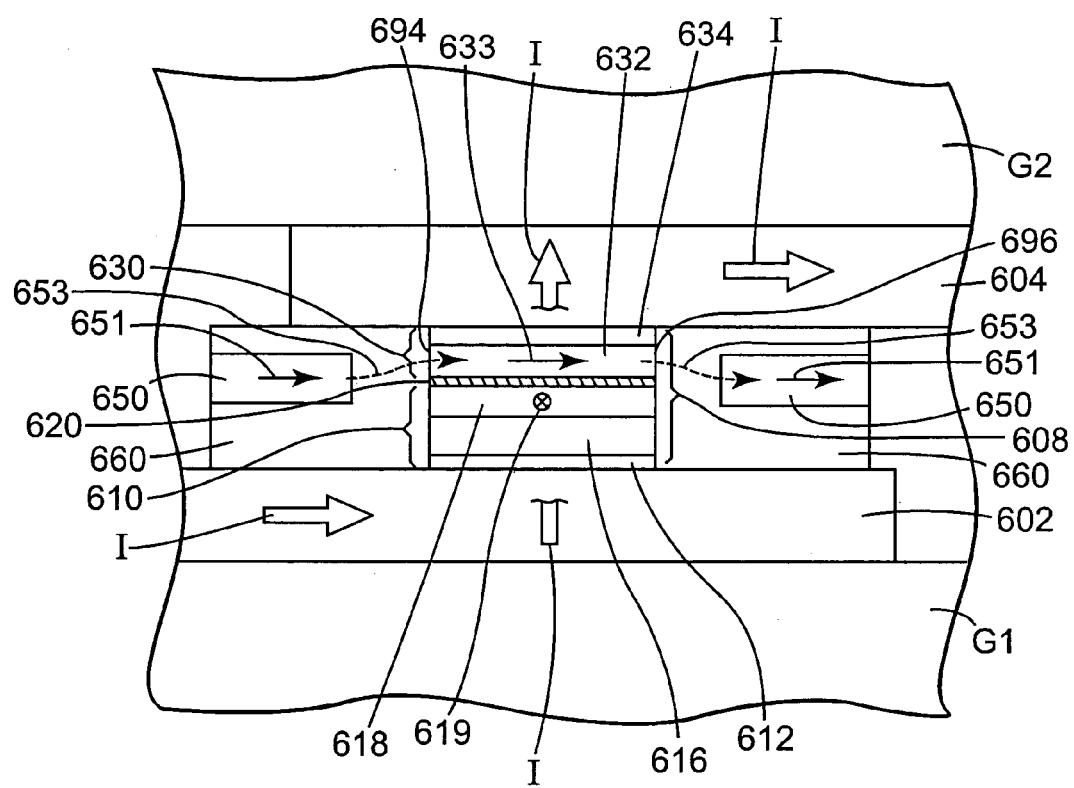
FIG. 6 is a section view of one embodiment of a tunnel valve read head as it would appear if taken through a plane whose edge is shown as line 542 in FIG. 5 and viewed from the disk surface.

According to the present invention, a MR read head uses a tunnel valve in place of the MR sensor 540 in the read/write head 525 of FIG. 5. FIG. 6 is a section view of one embodiment of a tunnel valve read head 600 as it would appear if taken through a plane whose edge is shown as line 542 in FIG. 5 and viewed from the disk surface. The tunnel valve read head 600 of FIG. 6 is presented for the purposed of explaining the operation of the tunnel valve.

Referring to FIG. 6, the paper of FIG. 6 is a plane parallel to the ABS and through substantially the active sensing region, i.e., the tunnel junction, of the tunnel valve read head to reveal the layers that make up the head. The tunnel valve read head includes an electrical lead 602 formed on the gap layer G1 substrate, an electrical lead 604 below gap layer G2, and the tunnel valve 608 formed as a stack of layers between electrical leads 602, 604. The tunnel valve 608 includes a first electrode multilayer stack 610, an insulating tunnel barrier layer 620, and a top electrode stack 630. Each of the electrodes includes a ferromagnetic layer in direct contact with tunnel barrier layer 620, i.e., ferromagnetic layers 618 and 632.

The base electrode layer stack 610 formed on electrical lead 602 includes a seed or "template" layer 612 on the lead 602, a layer of antiferromagnetic material 616 on the template layer 612, and a "fixed" ferromagnetic layer 618 formed on and exchange coupled with the underlying antiferromagnetic layer 616. The ferromagnetic layer 618 is called the fixed layer because its magnetic moment or magnetization direction is prevented from rotation in the presence of applied magnetic fields in the desired range of interest. The top electrode stack 630 includes a "free" or "sensing" ferromagnetic layer 632 and a protective or capping layer 634 formed on the sensing layer 632. The sensing ferromagnetic layer 632 is not exchange coupled to an antiferromagnetic layer, and its magnetization direction is thus free to rotate in the presence of applied magnetic fields in the range of interest. The sensing ferromagnetic layer 632 is fabricated so as to have its magnetic moment or magnetization direction (shown by arrow 633) oriented generally parallel to the ABS (the ABS is a plane parallel to the paper in FIG. 6) and generally perpendicular to the magnetization direction of the fixed ferromagnetic layer 618 in the absence of an applied magnetic field. The fixed ferromagnetic layer 618 in electrode stack 610 just beneath the tunnel barrier layer 620 has its magnetization direction fixed by interfacial exchange coupling with the immediately underlying antiferromagnetic layer 616, which also forms part of bottom electrode stack 610. The magnetization direction of the fixed ferromagnetic layer 618 is oriented generally perpendicular to the ABS, i.e., out of or into the paper in FIG. 6 (as shown by arrow tail 619).

Also shown in FIG. 6 is a biasing ferromagnetic layer 650 for longitudinally biasing the magnetization of the sensing ferromagnetic layer 632, and an insulating layer 660 separating and isolating the biasing layer 650 from the sensing ferromagnetic layer 632 and the other layers of the tunnel valve 608. The biasing ferromagnetic layer 650 is a hard magnetic material, such as a CoPtCr alloy, that has its magnetic moment (shown by arrow 651) aligned in the same direction as the magnetic moment 633 of the sensing ferromagnetic layer 632 in the absence of an applied magnetic field. The insulating layer 660, which is preferably alumina ($Al_2O_3$) or silica ($SiO_2$), has a thickness sufficient to electrically isolate the biasing ferromagnetic layer 650 from the tunnel valve 608 and the electrical leads 602, 604, but is still thin enough to permit magnetostatic coupling (shown by dashed arrow 653) with the sensing ferromagnetic layer 632. The product M*t (where M is the magnetic moment per unit area of the material in the ferromagnetic layer and t is the thickness of the ferromagnetic layer) of the biasing ferromagnetic layer 650 must be greater than or equal to the M*t of the sensing ferromagnetic layer 632 to assure stable longitudinal biasing. Since the magnetic moment of $Ni_{(100-x)}$—$Fe_{(x)}$ that is typically used in the sensing ferromagnetic layer 632 is about twice that of the magnetic moment of a typical hard magnetic material suitable for the biasing ferromagnetic layer 650, such as $CO_{75}Pt_{13}Cr_{12}$, the thickness of the biasing ferromagnetic layer 650 is at least approximately twice that of the sensing ferromagnetic layer 632.

A sense current I is directed from first electrical lead 602 perpendicularly through the antiferromagnetic layer 616, the fixed ferromagnetic layer 618, the tunnel barrier layer 620, and the sensing ferromagnetic layer 632 and then out through the second electrical lead 604. As described previously, the amount of tunneling current through the tunnel barrier layer 620 is a function of the relative orientations of the magnetizations of the fixed and sensing ferromagnetic layers 618, 632 that are adjacent to and in contact with the tunnel barrier layer 620. The magnetic field from the recorded data causes the magnetization direction of sensing ferromagnetic layer 632 to rotate away from the direction 633, i.e., either into or out of the paper of FIG. 6. This changes the relative orientation of the magnetic moments of the ferromagnetic layers 618, 632 and thus the amount of tunneling current, which is reflected as a change in electrical resistance of the tunnel valve 608. This change in resistance is detected by the disk drive electronics and processed into data read back from the disk. The sense current is prevented from reaching the biasing ferromagnetic layer 650 by the electrical insulating layer 660, which also insulates the biasing ferromagnetic layer 650 from the electrical leads 602, 604.

In a magnetic recording device the read head senses flux from small magnetized regions or magnetic bits written into a thin film magnetic medium above which the head is suspended. Increased capacity disk drives are achieved in part by higher magnetic bit areal densities. Thus the area of each magnetic region or bit must be decreased but this thereby gives rise to reduced magnetic flux. Magnetic recording heads which can sense reduced magnetic flux with greater output signal are thereby required for higher performance and higher capacity magnetic recording disk drives.

Figure 7:
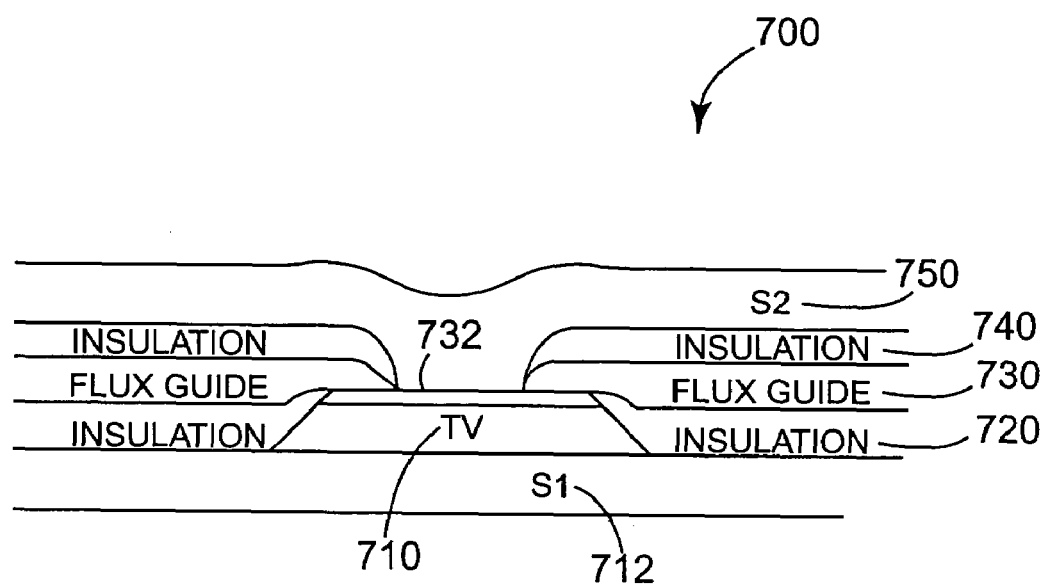
FIG. 7 illustrates a tunnel valve read head according to the present invention.

FIG. 7 illustrates a tunnel valve read head 700 according to the present invention. In FIG. 7, a tunnel valve 710 is patterned at a first shield layer 712. Insulation 720 is deposited using the self-aligned process. A flux guide 730 is deposited so that it overlaps with and is coupled to the tunnel valve 710, but does not completely extend over the tunnel valve 710. The flux guide 730 is then covered with insulation 740 using a self-aligned process. Self-aligned processes allow a feature to be defined without precise contact alignment. As with the other self-aligned processes, a first feature is patterned by a backside process step. Then a second feature is defined by a second backside process step. This second backside process step uses an aspect of the first process step to define the second feature. After depositing the insulation over the flux guide, the second shield 750 is formed.

The flux guide 730 thus makes physical connection with the free layer 732 of the tunnel valve 710 while the flux guide 730 is insulated from the shields 712, 750. By separating the flux guide 730 and the free layer 732 from the shields 712, 750, the shunting of current is prevented. Thus, the flux guide 730 increases the amount of magnetic flux in the active region of the sensor 700. Consequently, the output signal of the tunnel valve sensor 700 with the flux guide 730 is enhanced by the amount of extra flux in the active region of the sensor 700.

Figure 8:
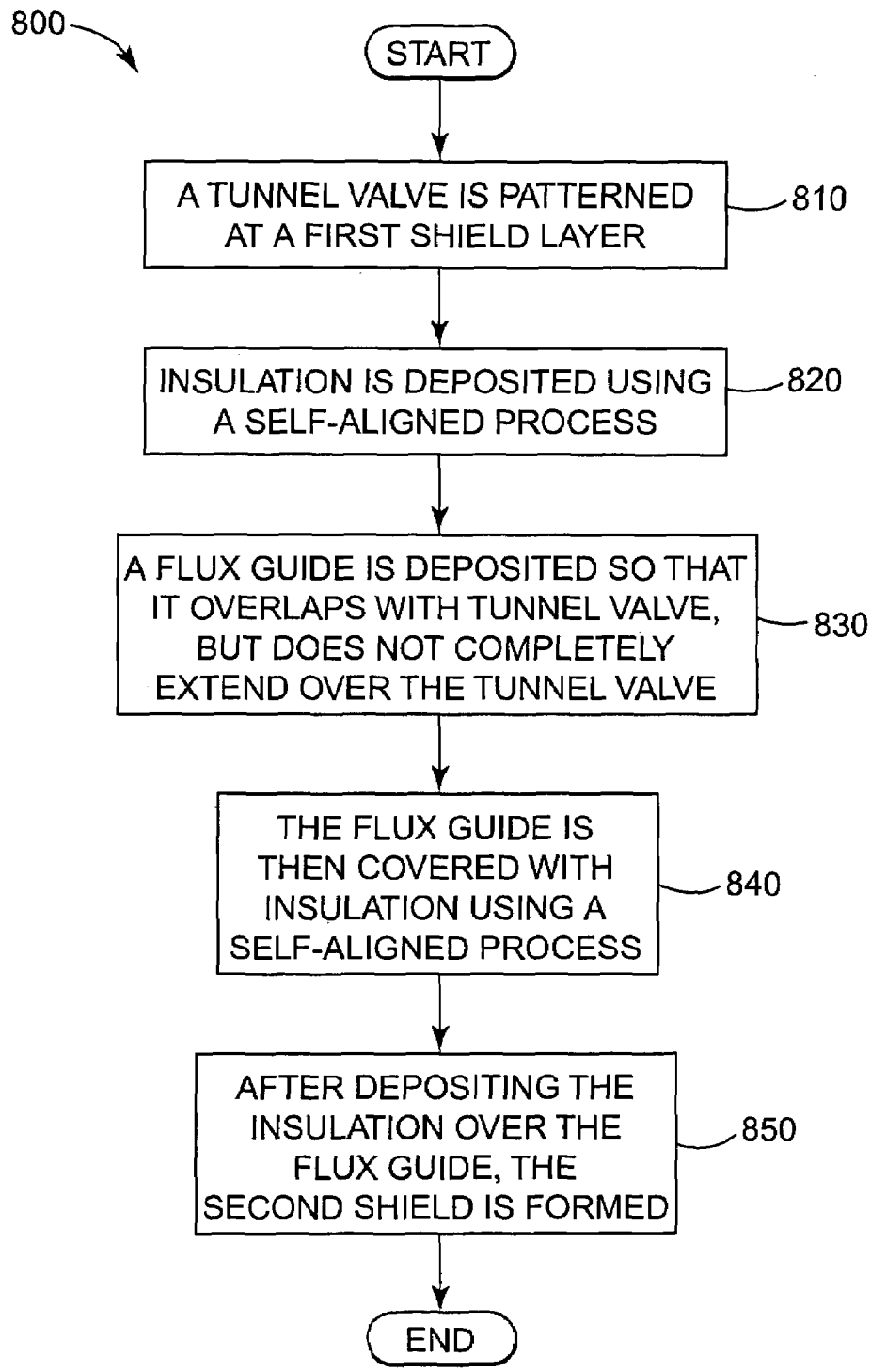
FIG. 8 illustrates a flow chart of a method of making a tunnel valve head with a flux guide according to the present invention.

FIG. 8 illustrates a flow chart 800 of a method of making a tunnel valve head with a flux guide according to the present invention. In FIG. 8, a tunnel valve is patterned at a first shield layer 810. Insulation is deposited using a self-aligned process 820. A flux guide is deposited 830 so that it overlaps with tunnel valve, but does not completely extend over the tunnel valve. The flux guide is then covered with insulation using a self-aligned process 840. After depositing the insulation over the flux guide, the second shield is formed 850.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for making a tunnel valve head with a flux guide, comprising:

forming a tunnel valve over a portion of a first shield layer, the shield layer being exposed at opposite sides of the tunnel valve and the tunnel valve comprising a free layer distal to the first shield layer;

depositing a first insulation layer over the first shield layer on opposite sides of the tunnel valve layer and up to a top surface of the free layer;

depositing a flux guide over the first insulation layer and extending over only a portion of the top surface of the free layer at opposite sides of the free layer;

forming a second insulation layer over the flux guide to completely cover the flux guide while leaving only a central portion of the free layer exposed; and forming a second shield layer over the second insulation and the exposed portion of the free layer, wherein the flux guide is physically isolated by the first and second insulation layers to prevent current shunts therefrom.

2. The method of claim 1 wherein the depositing the first insulation layer over the first shield layer and around the tunnel valve is performed using a self-aligning process wherein regions of different thicknesses are formed with a single masking step.

3. The method of claim 1 wherein the flux guide is physically connected to the free layer of the tunnel valve.

4. The method of claim 1 wherein the forming a second insulation layer over the flux guide to completely cover the flux guide while leaving a portion of the free layer exposed is performed using a self-aligning process wherein regions of different thicknesses are formed with a single masking step.

5. The method of claim 1 wherein the flux guide increases an amount of magnetic flux in the tunnel valve.

6. The method of claim 1 wherein the flux guide is further configured to increase an amount of magnetic flux in the tunnel valve to enhance an output signal of the tunnel valve.

7. The method of claim 1 wherein the forming a tunnel valve at a first shield layer further comprises:

forming an antiferromagnetic (AFM) layer of electrically insulating antiferromagnetic material;

depositing a pinned layer of ferromagnetic material in contact with said AFM layer, said pinned layer making electrical contact with said first shield;

forming a free layer of ferromagnetic material; and forming a tunnel barrier layer of electrically insulating material between said pinned and free layers.

* * * * *